(12) United States Patent
Chen et al.

(10) Patent No.: US 8,391,408 B2
(45) Date of Patent: Mar. 5, 2013

(54) METHOD AND APPARATUS FOR SPATIAL MAPPING MATRIX SEARCHING

(75) Inventors: Cheng-Ming Chen, Hsinchu (TW);
Chien-Yu Kao, Sanchong (TW);
Pang-An Ting, Fongyuan (TW);
Shang-Ho Tsai, Dashe Township (TW)

(73) Assignee: Industrial Technology Research Institute, Hsinchu (TW)

( * ) Notice: Subject to any disclaimer, the term of this patent is extended or adjusted under 35 U.S.C. 154(b) by 860 days.

(21) Appl. No.: 12/431,579

(22) Filed: Apr. 28, 2009

(65) Prior Publication Data

US 2009/0279624 A1    Nov. 12, 2009

Related U.S. Application Data

(60) Provisional application No. 61/050,970, filed on May 6, 2008.

(51) Int. Cl.
*H04L 25/49* (2006.01)

(52) U.S. Cl. ....................................................... 375/299
(58) Field of Classification Search .................. 375/295, 375/296, 299, 260
See application file for complete search history.

(56) References Cited

U.S. PATENT DOCUMENTS

| 7,218,689 B2* | 5/2007 | Gupta | 375/340 |
| 2006/0072514 A1* | 4/2006 | Kent et al. | 370/335 |

* cited by examiner

*Primary Examiner* — Kevin Kim
(74) *Attorney, Agent, or Firm* — Alston & Bird LLP

(57) ABSTRACT

A spatial mapping matrix searching apparatus may include a plurality of antennae configured to receive a plurality of transmission signals, a post-coding module configured to generate a post-coding information according to the received plurality of transmission signals and generate a received signal from the received plurality of transmission signals, and a pre-coding module configured to generate a pre-coding information according to the post-coding information.

18 Claims, 6 Drawing Sheets

METHOD AND APPARATUS FOR SPATIAL MAPPING MATRIX SEARCHING

CROSS-REFERENCE TO RELATED APPLICATIONS

This application claims priority to U.S. Provisional Patent Application No. 61/050,970, filed on May 6, 2008, entitled "METHOD AND APPARATUS FOR SPATIAL MAPPING MATRIX SEARCHING," which is incorporated herein by reference in its entirety.

BACKGROUND OF THE INVENTION

The present invention relates to wireless communication systems. More particularly, the present invention relates to spatial mapping matrix searching in wireless communication systems.

Modern wireless communication systems generally must be capable of providing voice and broadband data services. Many wireless communication systems, such as one that deploys the third generation partnership project (3GPP) standard for LTE or IEEE 802.16 series (e.g. WiMax standard), incorporate applying transmit beamforming to antenna diversity over multiple-input multiple-output channels (MIMO channels) to increase the data transfer rate of the data services. The data transfer rate may be improved by increasing the diversity gain and/or coding gain of the wireless communication systems adapting the antenna diversity. This may be accomplished by providing a feedback of information such as a spatial mapping matrix, including information processed by a receiver, such as a mobile station (MS), from its received signals transmitted by a transmitter, such as a base station (BS), to the transmitter to adjust or tune phases or power consumption of the antennae. Methods for searching a spatial mapping matrix therefore play an important role in improving data service.

The beamforming methods for finding a closed-loop spatial mapping matrix for MIMO system may include an eigen-beamforming method, a Grassmannian spatial mapping method, and an equal-gain spatial mapping method. The eigen-beamforming method selects eigenvectors that corresponds to maximum eigenvalues of a channel matrix representing the channel response of the MIMO channel to archive largest channel capacity. However, the large amount of feedback information, to which the desired eigenvectors and eigen decomposition results of the channel matrix information are embedded, renders this method hard to be visualized in real world system. The Grassmannian spatial mapping matrix method is a codebook construction method and it works well in some environment having MIMO channels. However, the optimal codebook may be difficult to construct. The equal gain spatial mapping matrix method only changes the phase of each combined signal streams and has no PAPR between different transmitted antennae. The exhaustive searching for any phase combination in the spatial mapping matrices method may be applicable of finding the best achievable solution, i.e. the spatial mapping matrix. However, this method may lack a closed form solution for its spatial mapping matrix in most MIMO channels.

It may therefore be desirable to have an equal gain spatial mapping matrix searching method having closed form solution for finding spatial mapping matrices for wireless communication systems comprising MIMO channels.

BRIEF SUMMARY OF THE INVENTION

Embodiments of the present invention may provide a method for equal-gain spatial mapping matrix searching. In one embodiment, the method may include receiving pre-coding information, rotating a phase of a plurality of transmission signals according to the pre-coding information, and transmitting the plurality of phase-rotated transmission signals with a plurality of antennae.

Some embodiments of the present invention may provide a method for equal-gain spatial mapping matrix searching. In another embodiment, the method may include receiving a plurality of transmission signals by a plurality of antennae, generating post-coding information, post-coding the received plurality of transmission signals with the post-coding information, generating pre-coding information from the post-coding information, and sending the pre-coding information to a transmitter transmitting the plurality of transmission signals.

Some embodiments of the present invention may also provide a method for spatial mapping matrix searching. The method may include receiving a plurality of transmission signals by a plurality of antennae of a receiver, setting a phase of one of the received plurality of transmission signals as a phase reference, determining each phase difference of each of the plurality of transmission signals with reference to the phase reference, collecting each phase difference of each of the plurality of transmission signals to generate a pre-coding information, and sending the pre-coding information to a transmitter.

Other embodiments of the present invention may provide an equal-gain spatial mapping matrix searching apparatus. The equal-gain spatial mapping matrix searching apparatus may include a plurality of antennae configured to receive a plurality of transmission signals, a post-coding module configured to generate a post-coding information according to the received plurality of transmission signals and generate a received signal from the received plurality of transmission signals, and a pre-coding module configured to generate a pre-coding information from the post-coding information.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, embodiments of which are illustrated in the accompanying drawings. Wherever possible, the same reference numbers will be used throughout the drawings to refer to the same or like parts.

Figure 1:
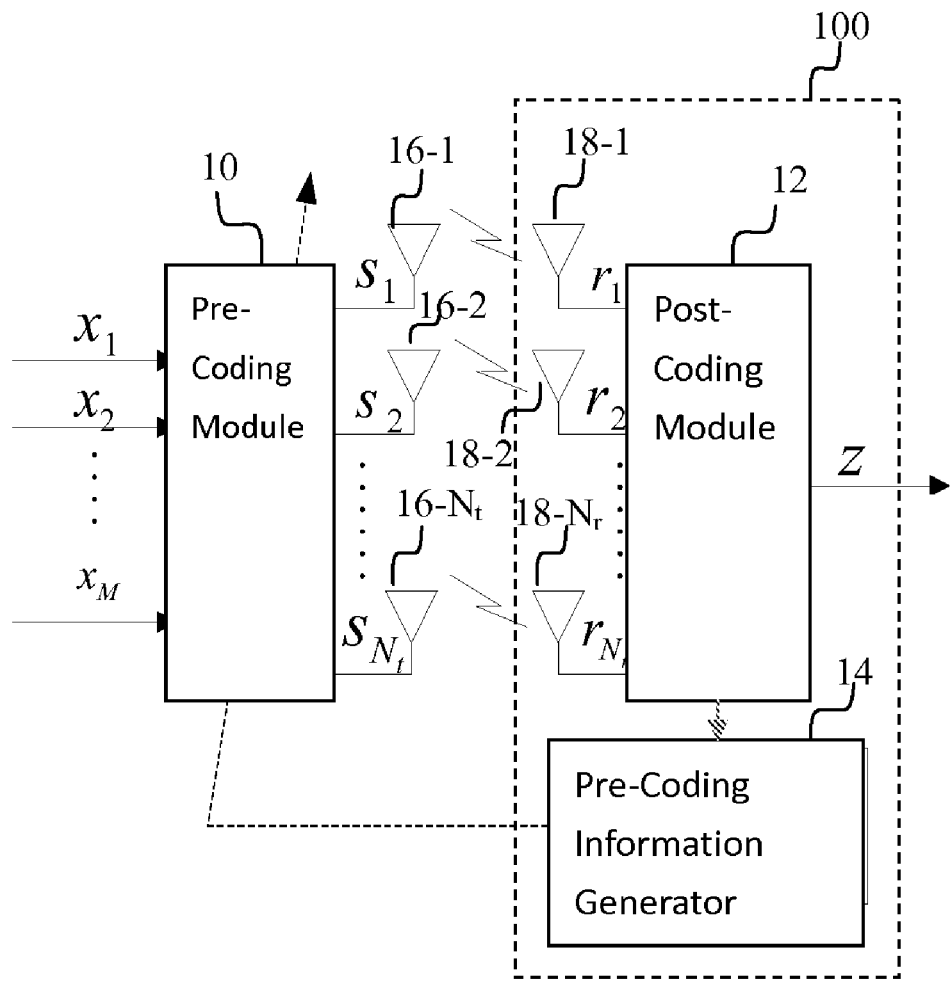
FIG. 1 is a diagram illustrating equal-gain spatial mapping matrix searching apparatus according to an embodiment of the present invention.

FIG. 1 is a diagram illustrating equal-gain spatial mapping matrix searching apparatus 100 according to an embodiment of the present invention. Referring to FIG. 1, the equal-gain spatial mapping matrix searching apparatus 100 includes a plurality of antennae, 18-1, 18-2 to 18-$N_t$, a post-coding module 12 and a pre-coding information generator 14. The plurality of antennae 18-1, 18-2 to 18-$N_t$ may be configured to receive a plurality of transmission signals $s_1$, $s_2$ to $s_{Nt}$ to become received signals $r_1$, $r_2$ to $r_{Nr}$, wherein $N_t$ is the number of antennae of a transmitter (not numbered) and $N_r$ is the number of antennae of a receiver (not numbered). The post-coding module 12 is configured to generate post-coding information $\hat{G}$ according to the received signals $r_1$, $r_2$ to $r_{Nt}$ and a channel response matrix $\hat{H}$ of a multi-input-multi-output (MIMO) channel where the plurality of transmission signals $s_1$, $s_2$ to $s_{Nt}$ are propagated. In one embodiment, the post-coding information $\hat{G}$ may be represented as an M by $N_r$ matrix, and the channel response $\hat{H}$ may be represented as an $N_r$ by $N_t$ matrix, wherein M is the rate of a spatial multiplexing transmission.

In addition, the pre-coding information generator 14 may be configured to generate pre-coding information $\hat{F}$ (not shown in FIG. 1) from the post-coding information $\hat{G}$. In one embodiment, the pre-coding information $\hat{F}$ may be represented as an $N_t$ by M matrix such as $$\hat{F}(\theta) = \begin{pmatrix} e^{j\theta_{11}} & e^{j\theta_{12}} & \cdots & e^{j\theta_{1M}} \\ e^{j\theta_{21}} & e^{j\theta_{22}} & \cdots & e^{j\theta_{2M}} \\ \vdots & \vdots & \ddots & \vdots \\ e^{j\theta_{N_t 1}} & e^{j\theta_{N_t 2}} & \cdots & e^{j\theta_{N_t M}} \end{pmatrix}, \quad (1)$$

wherein $\theta_{ij}$ represents the phase angle of the entry $e^{j\theta_{ij}}$ located at the i-th row and j-th column of $\hat{F}$. Moreover, $e^{j\theta_{ij}}$ represents the phase rotation having the amount of the phase angle $\theta_{ij}$. The pre-coding information $\hat{F}$ may be passed to a transmitter transmitting the plurality of transmission signals $s_1$, $s_2$ to $s_{Nt}$. Referring to FIG. 1 again, the transmission signals are the product results of a plurality of input signals $x_1$, $x_2$ to $x_M$ to a pre-coding module 10 and the pre-coding information $\hat{F}$. The plurality of transmission signals $s_1$, $s_2$ to $s_{Nt}$ may therefore be represented as $$\vec{s} = \hat{F}(\theta) \cdot \vec{x} \quad (2)$$

wherein $\vec{s}$ is a transmission signal vector equal to $$\begin{pmatrix} s_1 \\ s_2 \\ \vdots \\ s_{N_t} \end{pmatrix},$$

$\vec{x}$ is a input signal vector $$\begin{pmatrix} x_1 \\ x_2 \\ \vdots \\ x_M \end{pmatrix},$$

and $\hat{F}(\theta)$ is the matrix representing the pre-coding information generated by the pre-coding information generator 14. Moreover, each entry $e^{j\theta_{ij}}$ of the matrix $\hat{F}(\theta)$ may include phase rotation information of each input signal $x_j$. For example, a phase-rotated transmission signal $s_5$ having phase rotation different from its input signal $x_5$ with the amount of phase angle $\theta_{15}$ may be formed by applying the related entry $e^{j\theta_{15}}$ of the pre-coding information to the input signal $x_5$ as $$s_5 = e^{j\theta_{15}} x_5 \quad (3)$$

Therefore, in this embodiment, a receive signal vector $$\vec{r} = \begin{pmatrix} r_1 \\ r_2 \\ \vdots \\ r_{N_r} \end{pmatrix}$$

may be obtained through the following formula:

$$\vec{r} = \hat{H} \cdot \vec{s} + \vec{n} \quad (4)$$

wherein $\hat{H}$ is the channel response, $\vec{s}$ is the transmission signal vector and $\vec{n}$ is noise added or coupled during the propagation of the plurality of transmission signals in the channel. A received signal $\vec{z}$ may therefore be represented as $$\vec{z} = \hat{G} \cdot \vec{r} = \hat{G} \cdot \hat{H} \cdot \hat{F}(\theta) \cdot \vec{x} + \hat{G} \cdot \vec{n} \quad (5)$$

In one embodiment, the post-coding information $\hat{G}$ may be generated by processing the received signals $r_1$, $r_2$ to $r_{Nr}$ to find a product of a conjugate transpose (hermitian) of the channel response $\hat{H}$ and the pre-coding information $\hat{F}(\theta)$ generated by the pre-coding information generator 14. Therefore, $\hat{G}$ may be configured to be equal to the product of the hermitian of $\hat{F}(\theta)$ and the hermitian of $\hat{H}$ as $$\hat{G} = (\hat{F}(\theta) \cdot \hat{H})^H \quad (6)$$

The pre-coding information $\hat{F}(\theta)$ may be generated by processing a criterion $\Gamma$ configured to be a product of a first product and a second product. The first product may be a product of the channel response $\hat{H}$ and the pre-coding information $\hat{F}$, and the second product may be a hermitian of the first product. Therefore, the criterion $\Gamma$ can be represented as $$\Gamma = (\hat{F}(\theta) \cdot \hat{H})^H \cdot \hat{H} \cdot \hat{F}(\theta) \quad (7)$$

To process the criterion Γ to get the pre-coding information $\hat{F}(\theta)$, for example, is to search a set of $\theta$ or $\hat{F}(\theta)$ to meet the best of the criterion Γ. The set of $\theta$ or $\hat{F}(\theta)$ may then be a equal-gain spatial mapping matrix and transmitted to the transmitter for configuring the phase of each of the transmission signals before being transmitted.

It may be understood by those skilled in the art that other criteria may also be applicable to find the spatial mapping matrix. In another embodiment, a criterion function such as a maximum likelihood (ML) function is used to search for a set of $\theta$ or $\hat{F}(\theta)$ when approaching the maximum likelihood. In still another embodiment, another criterion function such as a mean-square distance (MSD) or a root-mean-square distance function may be used to search for a set of $\theta$ or $\hat{F}(\theta)$ (a spatial mapping matrix) to rotate phases of the plurality of transmission signals to maximize the mean-square distance or root-mean-square distance of the plurality of transmission signals. In one embodiment, a minimum mean square error (MMSE) function may be used as a criterion function to search for a set of $\theta$ or $\hat{F}(\theta)$ to minimize the MSE of the plurality of transmission signals after being phase-rotated according to the set of $\theta$ or $\hat{F}(\theta)$ (spatial mapping matrix).

In another embodiment, a criterion function $\mu(\hat{\Theta})$ used to search for a spatial mapping matrix $\hat{\Theta}$ may be represented as a program in pseudo codes including following steps:

Step 1: Initially setting an iteration number n and $\hat{\Theta}$ as $$n=0, \text{ and } \hat{\Theta}^{(n)}=\hat{0} \qquad (8)$$

Step 2: Determine n=n+1 and $\phi_{offset}=f(n)$, and define sets $\Phi_{ij}$ as $$\Phi_{ij}\{\Phi_{ij,(k)th\ subset},\Phi_{ij,(k-1)th\ subset},\cdots,\Phi_{ij,(0)th\ subset}\}^{\phi_{ij}} \qquad (9)$$

wherein $k\geq 2$ and $\phi_{ij,(k)th\ subset}=f(\theta_{ij}^{(n)},\phi_{offset})$, for $1\leq i\leq N_r$ and $1\leq j\leq M$;

Step 3: Determine a criterion as $$\hat{\Theta}^{(n)} = \arg\max_{\forall \theta_{ij}\in\Phi_{ij}} \mu(\hat{\Theta}) \qquad (10)$$

Step 4: If n<b, go to Step 2; otherwise, end the program.

Those skilled in the art would understand that although the above program represents the generation of the pre-coding information having unit gain, that is, each of elements in the spatial mapping matrix $\hat{\Theta}^{(n)}$ having a coefficient equal to 1, other values of coefficients and/or pre-coding information having a non-unit gain may also be available, depending on the applications.

For example, b may be set as quantization bits per stream for each of the plurality of antennae of the transmitter and M may be set as the number of streams. Given $N_t=5$, $N_r=2$, b=4, k=2, M=1 and a channel response matrix of a MIMO channel be represented as $$\hat{H}=\text{Re}\{\hat{H}\}+j\text{Im}\{\hat{H}\} \qquad (11)$$

where Re$\{\cdot\}$ represents the real part of the channel response matrix $\hat{H}$ and Im$\{\cdot\}$ represents the imaginary part of the channel response matrix $\hat{H}$, respectively, and $$\text{Re}\{\hat{H}\} = \begin{pmatrix} -0.356 & -0.679 & 2.017 & -0.911 & 0.625 \\ 0.802 & -0.747 & 0.063 & 0.802 & -0.496 \end{pmatrix} \qquad (12)$$

and

-continued
$$\text{Im}\{\hat{H}\} = \begin{pmatrix} 0.719 & -0.440 & 0.350 & -0.719 & -0.100 \\ -1.062 & -0.547 & -0.178 & -0.621 & -0.721 \end{pmatrix} \qquad (13)$$

By applying the above method of the present invention, those skilled in the art can easily obtain that $$\hat{\Theta}^{(1)} = \Pi(0\ 0\ 1\ 0\ 1) \qquad (14)$$

$$\hat{\Theta}^{(2)} = \Pi\left(0\ 0\ 1\ 0\ \frac{3}{2}\right) \qquad (15)$$

$$\hat{\Theta}^{(3)} = \Pi\left(0\ \frac{1}{4}\ \frac{5}{4}\ 0\ \frac{7}{4}\right) \qquad (16)$$

and $$\hat{\Theta}^{(4)} = \Pi\left(0\ \frac{1}{8}\ \frac{9}{8}\ -\frac{1}{8}\ \frac{13}{8}\right) \qquad (17)$$

In comparison with a conventional spatial mapping matrix searching method, the present invention requires only $4\times 3^4$ iterations to find the spatial mapping matrix, whereas the conventional spatial mapping matrix searching method, such as an exhaustive search, may require over $2^{(4\times 5)}$ iterations to find the spatial mapping matrix.

Moreover, the proposed equal-gain spatial mapping matrix searching method of the present invention may be less complex than the conventional Grassmannian spatial mapping matrix searching algorithm if each elements of $\hat{\Theta}^{(n)}$ is 1, −1, j or −j. This is because the present invention involves only phase rotations in this situation and does not require magnitude multiplications for quantization bits per stream for each antenna of a transmitter less than 3 (i.e. b<3). Instead, the present invention only requires relatively simple mathematical operations such as sign exchange or exchange of the real part and the imaginary part of a spatial mapping matrix. Specifically in one embodiment, if $$\hat{\Theta}^{(b=1)}=\Pi(0\ 0\ 1\ 0\ 1) \qquad (18)$$

then to obtain $$e^{-j\hat{\Theta}^{(b=1)}}=(1\ 1\ -1\ 1\ -1) \qquad (19)$$

one needs only sign exchanges of elements in the matrix. In another embodiment, $$\hat{\Theta}^{(b=2)} = \Pi\left(0\ 0\ 1\ 0\ \frac{3}{2}\right) \qquad (20)$$

then to obtain $$e^{j\hat{\Theta}^{(b=2)}}=(1\ 1\ -1\ 1\ -j) \qquad (21)$$

one only needs to exchange signs and exchange the real part and the imaginary part of the original matrix. Therefore, by applying the method of the present invention, the complexity of the operations for spatial mapping matrix searching may be reduced.

Figure 2:
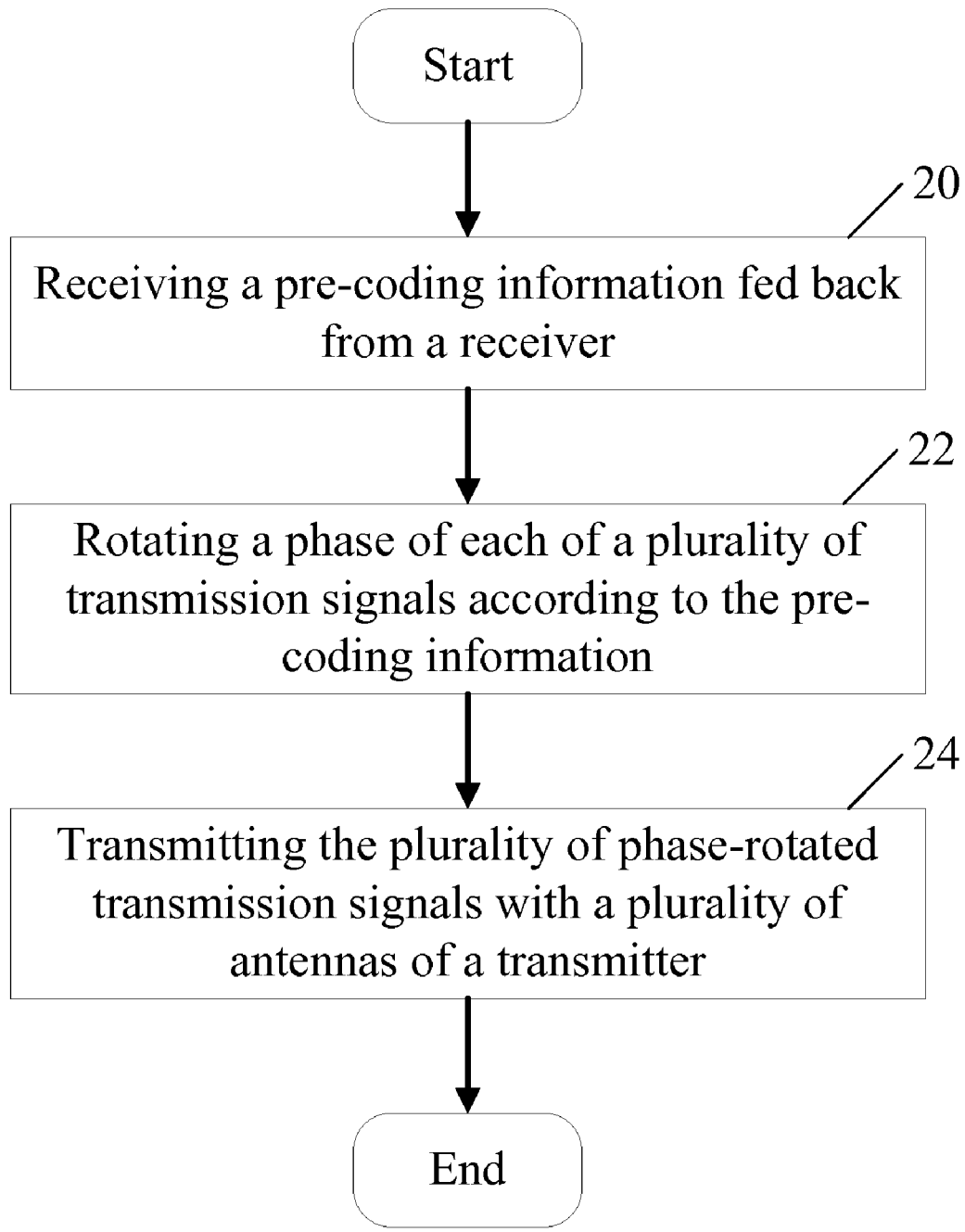
FIG. 2 is a flow chart illustrating a method for equal-gain spatial mapping matrix searching according to one embodiment of the present invention.

FIG. 2 is a flow chart illustrating a method for spatial mapping matrix searching according to another embodiment of the present invention. Referring to FIG. 2, at step 20, a base station may receive pre-coding information fed back from a receiver. The base station may then rotate a phase of each of a plurality of transmission signals from the pre-coding information at step 22. Next, at step 24, the base station may transmit the plurality of phase-rotated transmission signals with a plurality of antennae to the receiver.

Figure 3:
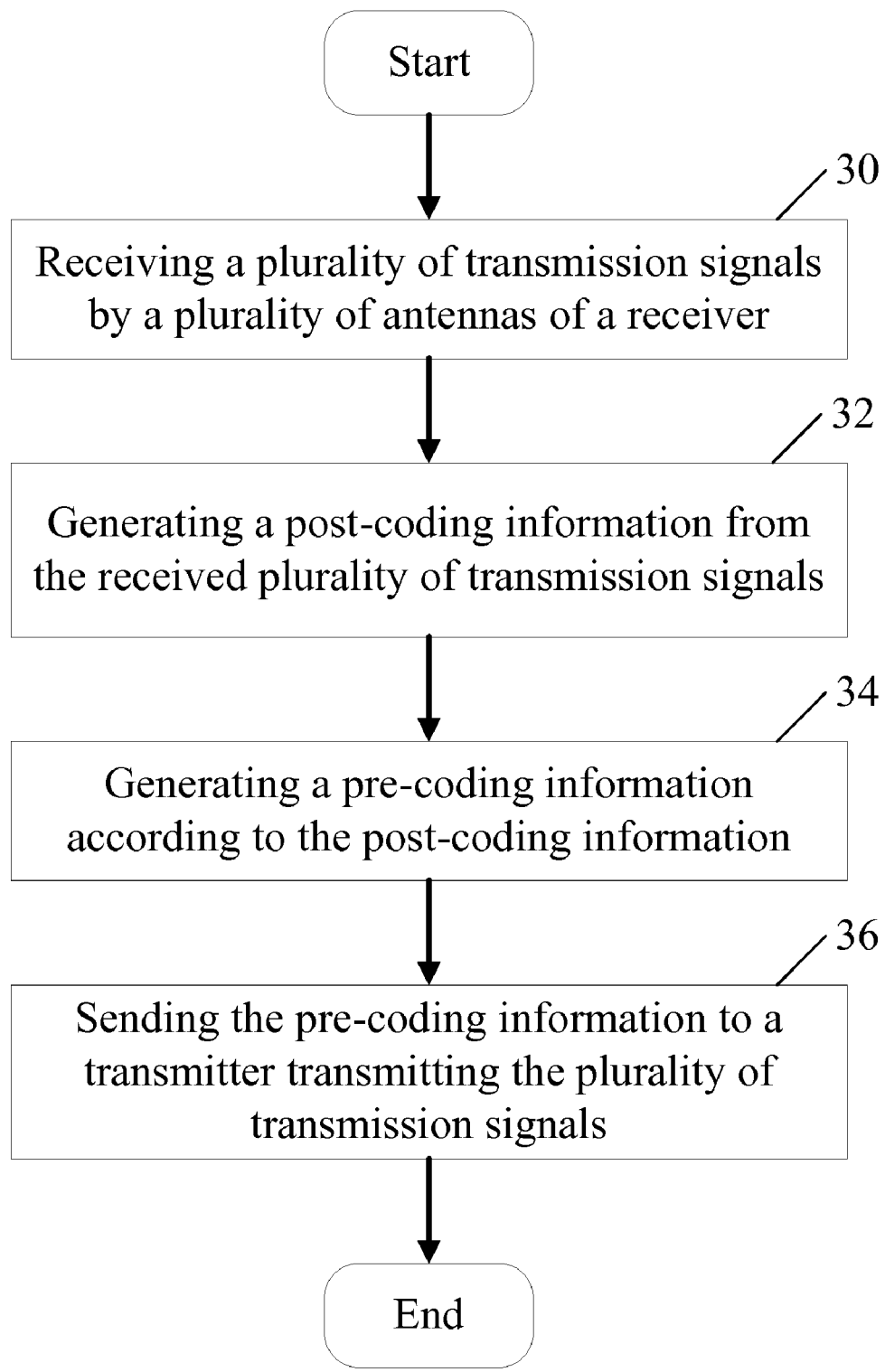
FIG. 3 is a flow chart illustrating a method for equal-gain spatial mapping matrix searching according to another embodiment of the present invention.

FIG. 3 is a flow chart illustrating a method for spatial mapping matrix searching according to still another embodiment of the present invention. Referring to FIG. 3, a mobile station may receive a plurality of transmission signals from a transmitter by a plurality of antennae at step 30. At step 32, a post-coding module of the mobile station may generate post-coding information from the received plurality of transmission signals. At step 34, a pre-coding information generator of the mobile station may generate pre-coding information from the post-coding information. Finally, at step 36, the mobile station may send the pre-coding information to the transmitter transmitting the plurality of transmission signals.

The post-coding information may be generated according to the received plurality of transmission signals. In one embodiment, the post-coding information may be generated by processing the plurality of transmission signals to find a product of a conjugate transpose (hermitian) of a channel response of a channel between the transmitter and the plurality of antennae, and the pre-coding information. In one embodiment, the pre-coding information generator may process a criterion configured to be a product of a first product and a second product to generate the pre-coding information. The first product may be a product of a channel response of a channel, where the plurality of transmission signals broadcasted and pre-coding information, and the second product may be a conjugate transpose (hermitian) of the first product. In another embodiment, the pre-coding information generator may generate the pre-coding information by maximizing the value of the product of the first product and the second product to find the pre-coding information corresponding to the maximized value of the product.

In still another embodiment, the pre-coding information generator may generate the pre-coding information from the post-coding information to minimize the mean square error (MMSE) of the received plurality of transmission signals. In yet another embodiment, the pre-coding information generator may generate the pre-coding information from the post-coding information to maximize the mean square distance (MSD) or root-mean-square distance of the received plurality of transmission signals. In other embodiment, the pre-coding information generator may generate the pre-coding information from the post-coding information to approach the maximum likelihood (ML) of the received plurality of transmission signals.

Figure 4:
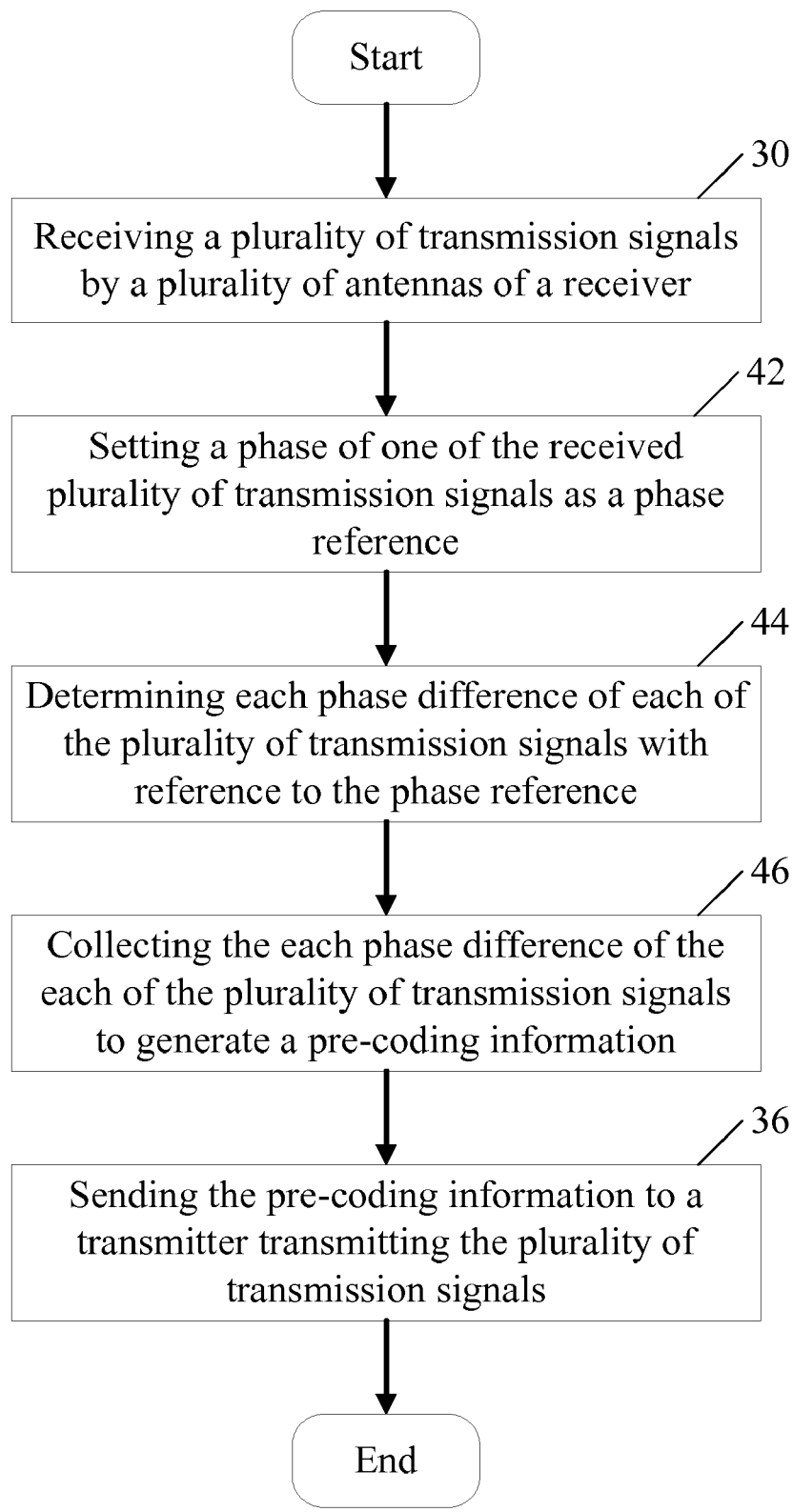
FIG. 4 is a flow chart illustrating a method for equal-gain spatial mapping matrix searching according to yet another embodiment of the present invention.

FIG. 4 is a flow diagram illustrating a method for spatial mapping matrix searching according to other embodiment of the present invention. Referring to FIG. 4, the method may be the same as those steps described in conjunction with FIG. 3, except as stated. In one embodiment, the mobile station may set a phase of one of the received plurality of transmission signals as a phase reference at step 42, and the mobile station may determine each phase difference of each of the plurality of transmission signals with reference to the phase reference at step 44. In addition, the mobile station may collect each phase difference of each of the plurality of transmission signals to generate the pre-coding information at step 46.

Figure 5:
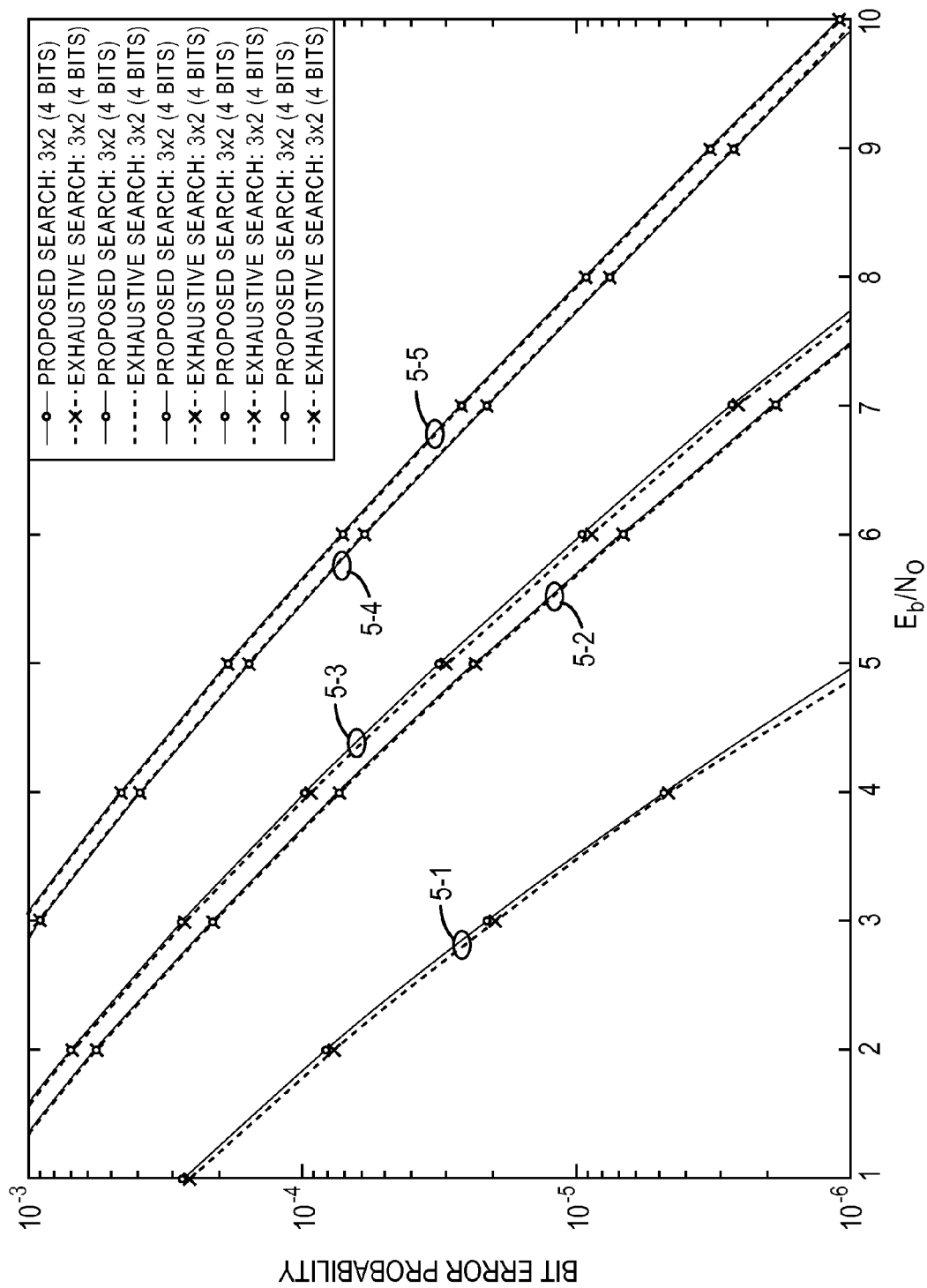
FIG. 5 is a diagram illustrating simulation results comparing equal-gain spatial mapping method with both conventional exhaustive searching and spatial mapping matrix searching methods of the present invention.

FIG. 5 is a diagram illustrating simulation results of the conventional exhaustive searching method and spatial mapping matrix searching method of the present invention. Referring to FIG. 5, each of pairs of simulation results 5-1, 5-2, 5-3, 5-4 and 5-5 includes simulation results of the present invention and simulation results of a conventional searching method. Solid lines represent simulation results of the present invention and doted lines represent simulation results of the conventional methods. From each pair of the simulation results, those skilled in the art will understand that the spatial mapping matrix searching method of the present invention exhibits advantageous results over conventional methods.

Figure 6:
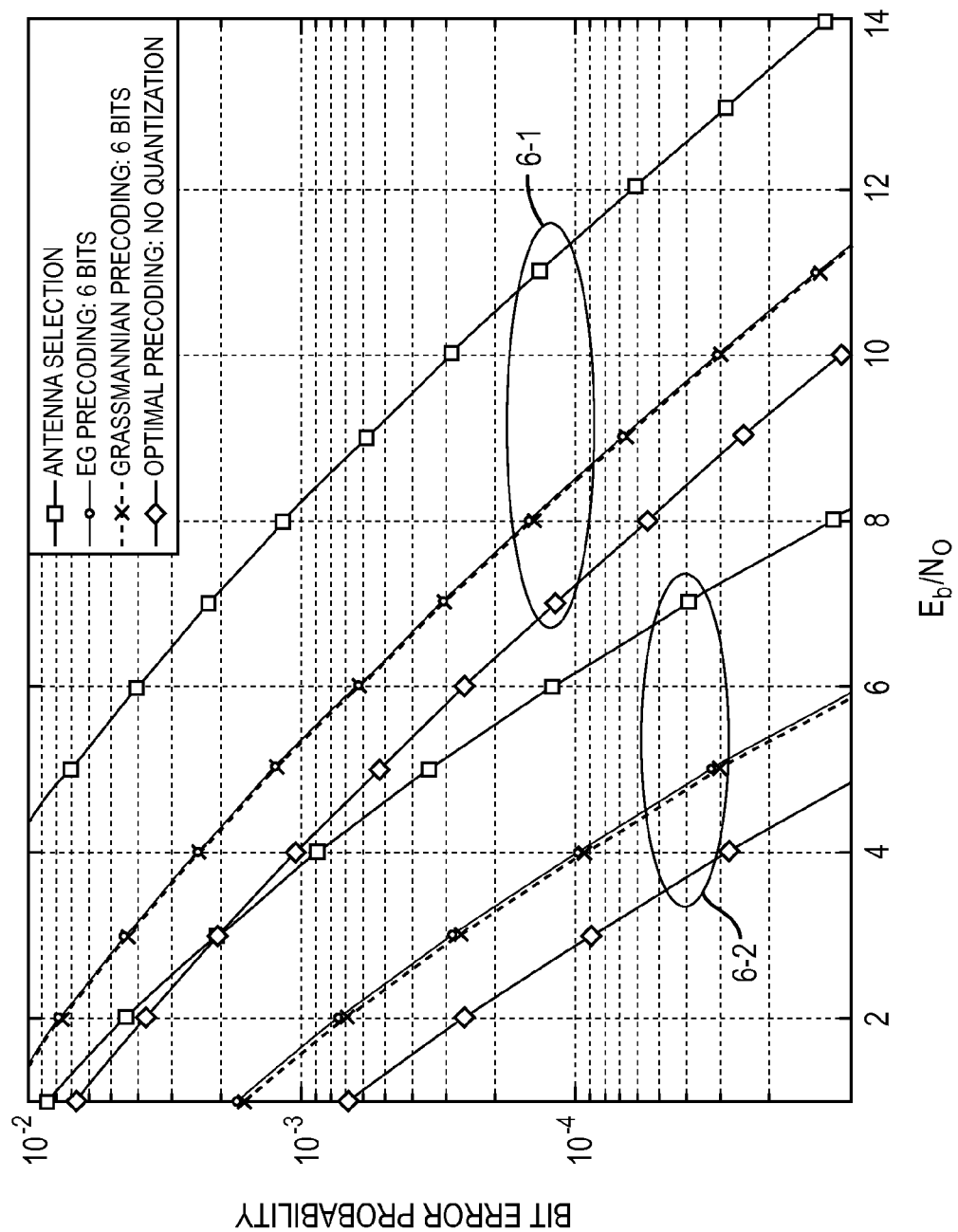
FIG. 6 is a diagram illustrating simulation results of conventional antenna selection method, Grassmannian pre-coding method, eigen-beamforming method and the method for equal-gain spatial mapping matrix searching of the present invention.

FIG. 6 is a diagram illustrating plotting of simulation results of antenna selection method, Grassmannian pre-coding method, eigen-beamforming and the method of the present invention. Referring to FIG. 6, the simulation results of the conventional antenna selection method are shown as squares, the simulation results of the conventional Grassmannian pre-coding method are shown as crosses, the simulation results of the conventional eigen-beamforming are shown as diamonds, and the simulation results of the present invention are shown as dots. These results are plotted in a signal-to-noise ratio ($E_b/N_0$) to bit error probability to show the performance of these methods. Moreover, sets of simulation results 6-1 and 6-2 show the simulation results of the four methods in different numbers of quantization bits, wherein each of the sets applies the same number of quantization bits.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method for spatial mapping matrix searching, the method comprising:
   receiving pre-coding information;
   rotating a phase of a plurality of transmission signals according to the pre-coding information; and
   transmitting the plurality of phase-rotated transmission signals with a plurality of antennae,
   wherein the pre-coding information is generated by processing a criterion configured to be a product of a first product and a second product to find the pre-coding information, and wherein the first product is a result of a channel response and the pre-coding information, the channel response being received over a channel where the plurality of transmission signals transmitted, and wherein the second product is a conjugate transpose of the first product.

2. The method of claim 1, wherein the pre-coding information is generated by a receiver receiving the plurality of transmission signals.

3. The method of claim 1, wherein the rotating a phase of a plurality of transmission signals according to the pre-coding information further comprises:
   determining the amount of phase difference of each of the plurality of transmission signals to be rotated according to the pre-coding information; and rotating the phase of each of the plurality of transmission signals by the amount of the phase difference of each of the plurality of transmission signals.

4. The method of claim 1, wherein the processing a criterion comprises maximizing the value of the product of the first product and the second product to obtain the pre-coding information corresponding to the maximized value of the product.

5. The method of claim 1, wherein the pre-coding information is generated by minimizing the minimum mean square error of the plurality of transmission signals.

6. The method of claim 1, wherein the pre-coding information is generated by maximizing the mean-square distance or root-mean-square distance of the plurality of transmission signals.

7. A method for spatial mapping matrix searching, the method comprising:
receiving a plurality of transmission signals by a plurality of antennae;
generating post-coding information from the received plurality of transmission signals;
generating pre-coding information from the post-coding information; and
transmitting the pre-coding information to a transmitter, wherein the post-coding information is generated by processing the plurality of transmission signals to find a product of a conjugate transpose of a channel response and the pre-coding information, and wherein the channel response is received over a channel between the transmitter and the plurality of antennae.

8. The method of claim 7, wherein the post-coding information is generated according to the received plurality of transmission signals.

9. The method of claim 7, wherein the pre-coding information is generated by processing a criterion configured to be a product of a first product and a second product to find the pre-coding information wherein the first product is a product of a channel response and the pre-coding information, the channel response being received over a channel where the plurality of transmission signals transmitted, and wherein the second product is a conjugate transpose of the first product.

10. The method of claim 9, wherein the processing a criterion comprises maximizing the value of the product of the first product and the second product to find the pre-coding information corresponding to the maximized value of the product.

11. The method of claim 7, wherein the step of generating pre-coding information from the post-coding information further comprises generating the pre-coding information from the post-coding information to minimize the minimum mean square error of the received plurality of transmission signals.

12. The method of claim 7, wherein the step of generating pre-coding information from the post-coding information further comprises generating the pre-coding information from the post-coding information to maximize the mean square distance or root-mean-square distance of the received plurality of transmission signals.

13. A method for spatial mapping matrix searching, the method comprising:
receiving a plurality of transmission signals by a plurality of antennae of a receiver;
setting a phase of one of the received plurality of transmission signals as a phase reference;
determining each phase difference of each of the plurality of transmission signals with reference to the phase reference;
collecting each phase difference of each of the plurality of transmission signals to generate pre-coding information; and
transmitting the pre-coding information to a transmitter.

14. The method of claim 13, wherein the step of collecting each phase difference of each of the plurality of transmission signals to generate pre-coding information further comprises processing a criterion configured to be a product of a first product and a second product to generate the pre-coding information, wherein the first product is a product of a channel response the pre-coding information, the channel response being received over a channel determined from the collected each phase difference of each of the plurality of transmission signals, and wherein the second product is a conjugate transpose of the first product.

15. The method of claim 14, wherein the processing a criterion further comprises maximizing the value of the product of the first product and the second product to find the pre-coding information corresponding to the maximized value of the product.

16. A spatial mapping matrix searching apparatus comprising:
a plurality of antennae configured to receive a plurality of transmission signals;
a post-coding module configured to generate post-coding information according to the received plurality of transmission signals; and
a pre-coding information generator configured to generate pre-coding information from the post-coding information, wherein the post-coding information is generated by processing the plurality of transmission signals to find a product of a conjugate transpose and the pre-coding information, wherein the channel response is received over a channel between a transmitter and the plurality of antennae.

17. The spatial mapping matrix searching apparatus of claim 16, wherein the pre-coding information is generated by processing a criterion configured to be a product of a first product and a second product to find the pre-coding information,
wherein the first product is a product of a channel response and the pre-coding information, the channel response is being received over a channel where the plurality of transmission signals broadcasted, and wherein the second product is a conjugate transpose of the first product.

18. The spatial mapping matrix searching apparatus of claim 17, wherein the criterion is processed by finding a maximized mean-square distance, maximized root-mean-square distance or the minimized minimum mean square error of the product.

* * * * *

UNITED STATES PATENT AND TRADEMARK OFFICE
CERTIFICATE OF CORRECTION

PATENT NO. : 8,391,408 B2
APPLICATION NO. : 12/431579
DATED : March 5, 2013
INVENTOR(S) : Chen et al.

It is certified that error appears in the above-identified patent and that said Letters Patent is hereby corrected as shown below:

In the Claims:

Column 10,
Line 18, "response the" should read --response and the--.

Signed and Sealed this
Twenty-first Day of May, 2013

Teresa Stanek Rea
*Acting Director of the United States Patent and Trademark Office*